(12) United States Patent
Kuffner et al.

(10) Patent No.: US 8,068,826 B2
(45) Date of Patent: Nov. 29, 2011

(54) METHOD AND APPARATUS FOR CONTROLLING TRANSMIT POWER AND INCUMBENT PROTECTION IN A COGNITIVE RADIO SYSTEM

(75) Inventors: Stephen L. Kuffner, Algonquin, IL (US); Lawrence M. Ecklund, Wheaton, IL (US); David P. Gurney, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 972 days.

(21) Appl. No.: 12/024,311

(22) Filed: Feb. 1, 2008

(65) Prior Publication Data

US 2009/0197627 A1 Aug. 6, 2009

(51) Int. Cl.
*H04B 17/00* (2006.01)
*H04B 7/00* (2006.01)
*H04W 24/00* (2009.01)

(52) U.S. Cl. ...................... 455/423; 455/522; 455/67.11
(58) Field of Classification Search ............... 455/426.1, 455/423, 41.1, 41.2, 426.2, 40, 522, 67.11
See application file for complete search history.

(56) References Cited

U.S. PATENT DOCUMENTS

| | | | |
|---|---|---|---|
| 5,850,596 A | 12/1998 | Reynolds | |
| 7,627,326 B1 * | 12/2009 | Miller, II | 455/454 |
| 7,881,726 B2 * | 2/2011 | Gurney et al. | 455/454 |
| 2005/0215203 A1 | 9/2005 | Waltho et al. | |
| 2006/0067354 A1 | 3/2006 | Waltho et al. | |
| 2006/0166692 A1 | 7/2006 | Waltho et al. | |
| 2007/0202867 A1 * | 8/2007 | Waltho et al. | 455/423 |
| 2008/0165754 A1 * | 7/2008 | Hu | 370/342 |
| 2008/0311866 A1 | 12/2008 | Roux et al. | |
| 2009/0034508 A1 * | 2/2009 | Gurney et al. | 370/351 |
| 2009/0047916 A1 * | 2/2009 | Haykin | 455/115.1 |
| 2009/0270025 A1 * | 10/2009 | Kossi et al. | 455/3.01 |

OTHER PUBLICATIONS

Federal Communications Commission—Unlicensed Operation in the TV Broadcast Bands—Notice of Proposed Rule Making—Adopted/Released, May 2004—38 pages.
Stephen R. Martin—"Interference Rejection Thresholds of Consumer Digital Television Receivers Available in 2005 and 2006"—OET Report, Federal Communications Commission, FCC/OET 07-TR-1003—pp. 5-9 through 5-12—Mar. 2007.
"ATSC Recommended Practice: Receiver Performance Guidelines"—Doc. A/74—Advanced Television Systems Committee—Jun. 2004—67 pages.
IEEE P902.22/DO.3 Draft Standard for Wireless Regional Area Networks Part 22: Cognitive Wireless RAN Medium Access Control (MAC) and Physical layer (PHY) specifications: Policies and procedures for operation in the TV Bands, May 2007; Subclause 6.13.5+, Control of Maximum Transmit EIRP at CPEs and BS for the Protection of TV Incumbents, p. 124.
International Search Report—Application No. PCT/US2009/032071 mailed Jun. 23 2009—18 pages.

* cited by examiner

*Primary Examiner* — Tilahun B Gesesse
(74) *Attorney, Agent, or Firm* — Barbara R. Doutre (57) ABSTRACT

A cognitive radio (CR) device (208 and/or 218) avoids interference with an incumbent (207) receiver by determining maximum allowed transmit power levels of the CR device based on estimates of the incumbent signal level and transmit splatter levels of the CR device. The CR device (208 and/or 218) avoids interference with the incumbent receiver while transmitting with maximum transmit power levels.

14 Claims, 5 Drawing Sheets

METHOD AND APPARATUS FOR CONTROLLING TRANSMIT POWER AND INCUMBENT PROTECTION IN A COGNITIVE RADIO SYSTEM

FIELD OF THE INVENTION

The present invention relates generally to wireless communication systems and more particularly to the control of transmit power and interference levels in a cognitive radio system.

BACKGROUND

Cognitive radios (CR) utilize a variety of co-existence techniques in order to attempt to operate successfully along with existing wireless communication networks or architectures. The CR concept is generally intended to enable frequency band sharing and reuse with incumbent users and/or other CR devices. The manner by which CR performance can be increased or extended, via the use of advanced cognitive techniques, is of current interest in the communications arena.

Wireless systems utilizing cognitive radio techniques are intended to allow a network or a wireless node to change its transmission or reception parameters to communicate efficiently and utilize spectrum on a secondary basis without interfering with incumbent users or other CR devices operating in the same frequency band. However, due to the wide variety of incumbent receiver equipment providers on the market and different field operating conditions, controlling the operating parameters of CR systems becomes a very challenging task. The mobility of many CR devices, such as portable radios, exacerbates the problem.

The unlicensed use of locally unused television white space (TVWS) spectrum is particularly challenging and comes under the regulation of the Federal Communications Commission (FCC) in the U.S. Currently the FCC is developing regulations including the use of geo-location database enabled CR TVWS devices and sensing-only CR TVWS devices.

Geo-location database enabled CR devices determine their own location, and from the geo-location database, determine the maximum allowed transmit power level that avoids causing interference to licensed incumbent (for example, TV) receivers. These CR power level computations are, as the FCC has currently proposed, based on receiver co-channel and adjacent channel interference protection ratios only. However, these co-channel and adjacent channel protection ratios do not adequately ensure avoiding interference to incumbent TV receivers.

For sensing-only based CRs that have no geo-location information or connection to a database, the radios must operate based on sensed signal information alone. A large class of TVWS devices will utilize only spectral sensing techniques to determine open spectrum. A need thus exists to ensure these sensing-only radios do not interfere with licensed incumbents.

Accordingly, there is a need for a technique to ensure that licensed incumbent receivers are adequately protected from all forms of unwanted CR interference, particularly in the arena using TVWS devices.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for addressing the maximization of transmit power and the control of interference levels of cognitive radio (CR) devices operating within an incumbent's spectrum. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions involved in determining allowable interference levels into the incumbent's system and adjusting transmit power levels of a CR unit in response thereto. The non-processor circuits may include, but are not limited to, a radio receiver, a radio transmitter, signal drivers, clock circuits, power source circuits, and user input devices. As such, these functions may be interpreted as steps of a technique for adjusting transmit power levels to avoid interference between a CR unit and an incumbent system or other CR device. Alternate channel (and beyond) interference protection ratios, as well as CR transmitter splatter levels are incorporated into the technique to avoid causing interference to incumbent receivers, such as TV receivers. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Briefly, in accordance with the present invention, there is described herein a method and apparatus to have CR devices operate amongst incumbent receivers while avoiding interference with the incumbent receiver. A method to determine the maximum allowed CR transmit power based on the characteristics of the incumbent receivers and CR transmitter, in order to avoid causing interference to incumbent receivers is provided. Particular attention is given to alternate (and beyond alternate) channel performance of both incumbent receivers and CR transmitters in the described method. For the purposes of this application, an alternate channel is defined as any channel that has a channel offset of two (N+/−2). Beyond alternate channel is defined as any channel that has a channel offset greater than (N+/−2) channels from the active channel (e.g. N+/−3, N+/−4 . . . ). Maximum allowed CR transmit power levels are limited based on CR device transmitter splatter levels in adjacent channels, alternate channels and beyond alternate channels. The simultaneous maximization of CR transmit power levels while minimizing and controlling interference into incumbent receivers protects incumbent systems, such as television receivers, while ensuring the most efficient utilization of the spectrum.

Figure 1:
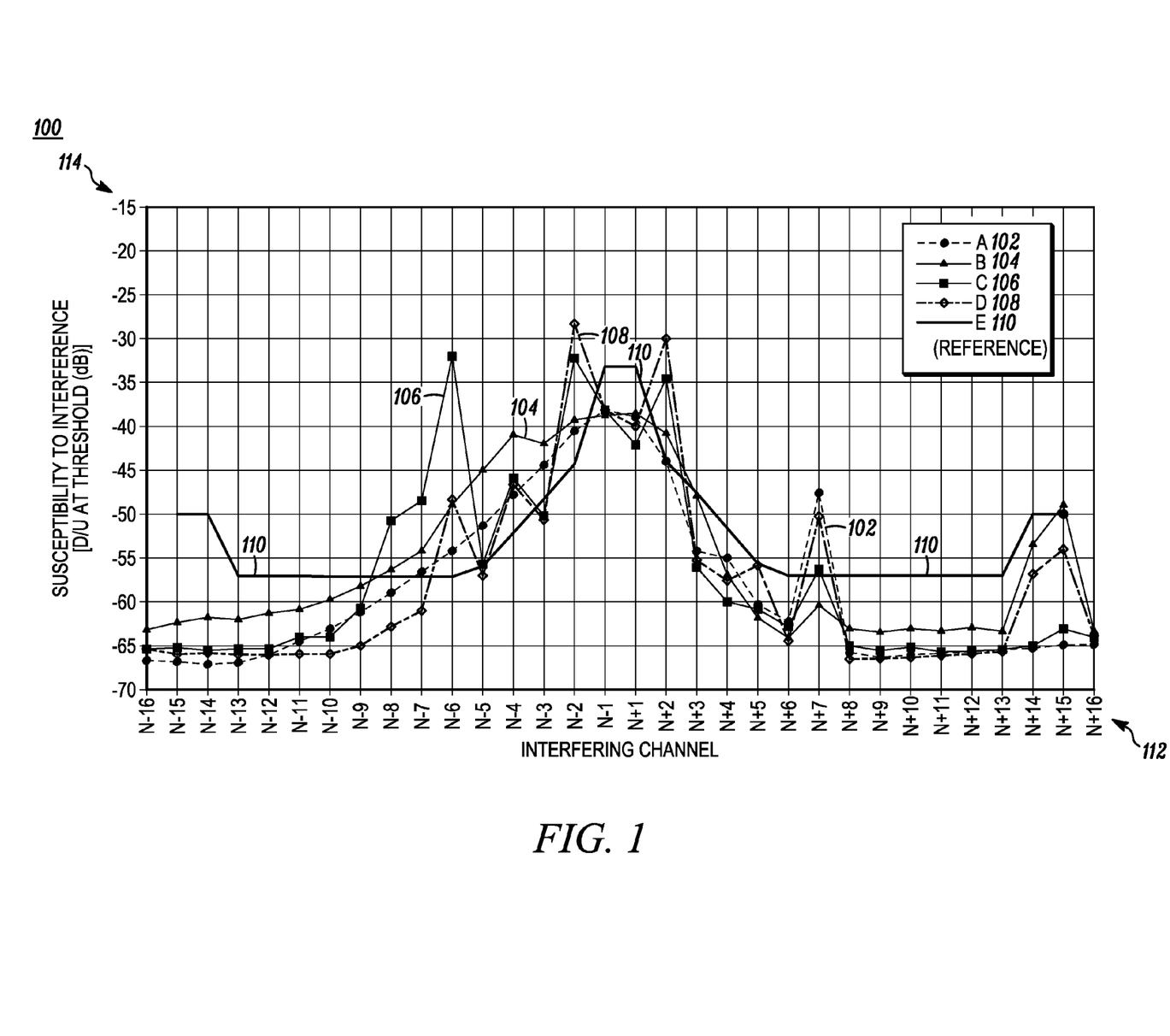
FIG. 1 illustrates an example of a graph of typical performance for various DTV receivers (incumbent receivers) with which cognitive radio (CR) devices operating in accordance with an embodiment of the invention are to avoid interference.

Referring to FIG. 1 there is shown an example of a graph 100 of data illustrating typical performance of DTV receivers (incumbent receivers) with which interference by CR devices is to be prevented. Reports such as the one shown in FIG. 1 are available from the FCC and indicate threshold limits that that will cause interference with the receivers. Graph 100 is based on data provided by S. R. Martin (March 2007), OET Report FCC/OET 07-TR-1003, "Interference Rejection Thresholds of Consumer Digital Television Receivers Available in 2005 and 2006, pages 5-12." Four examples of various DTV receivers A 102, B 104, C 106, and D 108 are shown with interfering channel number along the x-axis 112 versus susceptibility to interference threshold (dB) on the y-axis 114. E 110 is the recommended performance determined by industry as referenced by the Advanced Television Systems Committee (June 2004), ATSC Recommended Practice Receiver Performance Guidelines, Document A/74. The legend designators A, B, C, D, and E shown in graph 100 correspond to legend designators A3, I1, J1, N1 and a/74 Limit in the FCC report noted above and herein incorporated by reference.

Taking an example from graph 100, receiver A 102 and receiver C 106 are susceptible to interference on channel N−1 (adjacent channel) at threshold levels of around −38 to −39 dB, while on channel N−6 (beyond adjacent channel), receiver A 102 is only susceptible to threshold levels of −54 dB while receiver C 106 is far more susceptible to interference with a threshold of −32 dB. The threshold levels are given as desired-to-undesired ("D/U") ratios; a negative number indicates that the undesired signal is larger than the desired signal by that amount (e.g., −33 dB indicates the interferer can be no more than 33 dB larger than the desired signal to meet interference limits).

While the FCC in particular has proposed that users take into account TV receiver adjacent channel protection ratios when computing or estimating allowed transmit power levels for TVWS devices, no proposals have been made by the FCC that considers any form of alternate channel interference to TV receivers caused by CR devices. In addition, modeling of CR transmitter splatter levels has not been considered. In accordance with an embodiment of the invention, alternate channel interference modeling will be described herein and incorporated as part of a technique with which to address the incumbent interference issue. CR transmitter splatter levels will also be addressed in an embodiment of the invention.

It is generally recognized that over-the-air TV reception can be harmfully impaired by unlicensed emissions that degrade either the high end or low end of the TV receiver's dynamic range. Typical input signal levels into DTV receivers range from −83 dBm to −8 dBm. A strong off-channel signal presented to the TV receiver can limit its sensitivity due to a number of mechanisms discussed briefly later, while off-channel emissions from a CR transmitter that fall co-channel to the TV signal can effectively increase the local receiver noise floor. The effective and reliable management of both impairment mechanisms is the responsibility of white space cognitive radios to ensure coexistence while simultaneously increasing spectrum utilization.

The CR device's transmit spectral mask defines how much power spills into the adjacent channels and beyond. The main criteria that CR transmissions must satisfy while operating in the TVWS environment is that they should not harmfully impair licensed (e.g., TV) signal reception. There are two types of CR emissions that can impair a licensed TV receiver. In accordance with an embodiment of the invention, both types of interference are taken into account to avoid interference with an incumbent device. Each type of interference has its own set of characteristics and qualities.

TYPE 1 Interference:

The pass band (in-band, on-channel) level of the CR modulation exceeds the TV receiver selectivity limits (which could be due to limitations such as front-end overload, phase noise/reciprocal mixing, filter selectivity, or nonlinear effects like intermodulation or cross modulation). TV receiver selectivity (determined by interference protection (D/U) ratios for adjacent channel, alternate channel and beyond alternate channel) is considered in determining Type I interference tolerance.

TYPE 2 Interference:

The CR unit's out-of-band emissions (OOBE) or transmitter splatter that falls co-channel with the licensed incumbent signal and directly degrades the carrier to interference-plus-noise ("C/I+N") ratio of the desired TV signal. The degradation may be due to the CR unit adjacent channel emissions (N+/−1), alternate channel emissions (N+/−2), or beyond alternate channel emissions (N+/−3, N+/−4 . . . ).

Impairments of the first type are due to limitations in the TV receiver, while impairments of the second type are due to limitations in the CR transmitter. In accordance with the present invention, both types of interference effects are considered by the CR unit to ensure benign coexistence with incumbent systems. In accordance with the invention, both types of interference are addressed using power determination algorithms that are based on the required incumbent protection ratios and geo-location database or sensing techniques, in order to realize interference free operation of a CR device in the incumbent TV receiver's spectrum.

Essentially, geo-location databases provide information about expected TV signal strength versus geographic location, and estimation of CR signal path loss to the nearest affected TV receiver enables a geo-location enabled CR unit to adjust its transmission so as to not exceed specified TV receiver performance limitations. Sensing-only CR devices will not benefit from such techniques, and as such, the sensing-only emissions are controlled in a different manner described later.

Assuming DTV sets are designed per the Advanced Television systems Committee (ATSC) document A/74 recommended D/U ratios, an example ideal spectral mask based on the recommended D/U ratios is shown in Table 1:

Ideal CR Off-Channel TX Emissions Vs. Offset from a DTV Channel

| Incumbent Receiver Channel | Interference Protection D/U ratio (dB) | Off-channel TX emissions (dBr/6 MHz) |
| --- | --- | --- |
| N | +23 | — |
| N +/− 1 | −26 | −49 |
| N +/− 2 | −44 | −67 |
| N +/− 3 | −48 | −71 |
| N +/− 4 | −52 | −75 |
| N +/− 5 | −56 | −79 |
| N +/− 6-13 | −57 | −80 |
| N +/− 14, 15 | −50 | −73 |

Table 1 provides ideal off-channel emission levels vs. offset from a DTV channel. The "dBr" indicates dB relative to the average transmitted power. If a proposed mask is looser (i.e., less stringent) than this ideal mask (which it very likely will be in practical CR implementations), there is a need to further limit the CR transmit power due to CR transmitter splatter (or OOBE). The levels shown in Table 1 allow the CR device to transmit a maximum EIRP (equivalent isotropically radiated power) without exceeding the Type 1 TV receiver impairments while still satisfying Type 2 TV co-channel interference levels due to the CR splatter. In Table 1, N is the active operating channel for the TV receiver, and the indicated offsets in the first column indicate the channel offset (e.g., in 6 MHz steps in the U.S.) from the operating TV channel. Thus, the N+2 interference protection ratio (e.g., of −44 dB) describes how much interference a TV receiver can tolerate on the channel two channels (e.g., 12 MHz) above where it is currently tuned. The nominal interference protection ratios are typically characteristics of the incumbent receiver type (such that different receiver types, e.g., NTSC receivers, have different nominal interference protection ratio requirements), and are often set in conjunction with regulatory bodies. Note that D/U ratios in the incumbent database can be adjusted to address interference issues in the field. For sensing-only radios that do not have access to D/U ratios or predicted incumbent signal strengths in a database, a nominal conservative profile is preferably used, along with off-channel sensing techniques (described below).

Figure 2:
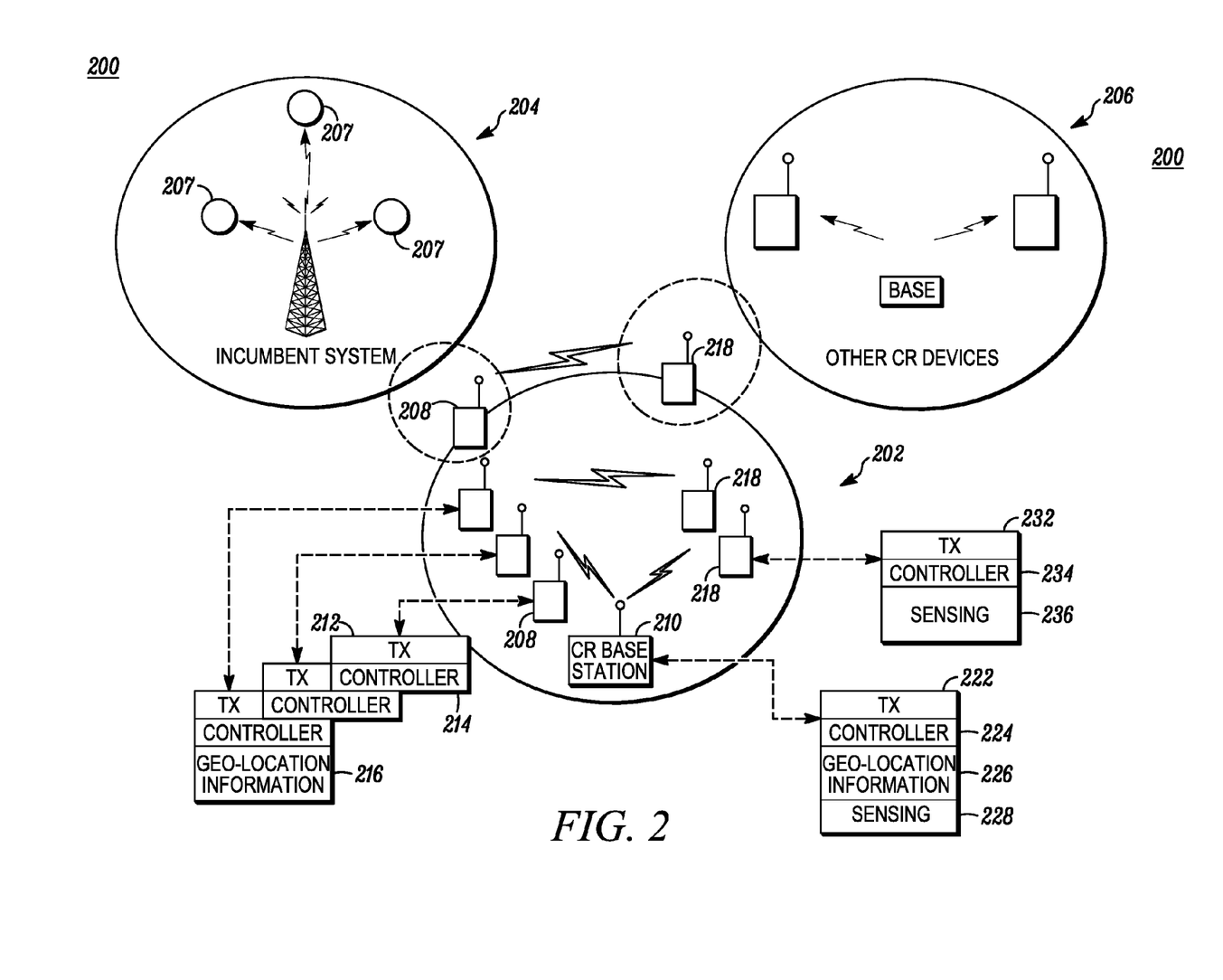
FIG. 2 illustrates a network diagram for a cognitive radio (CR) unit operating within an incumbent receiver's spectrum in accordance with an embodiment of the invention.

FIG. 2 illustrates a wireless communication network 200 operating in accordance with an embodiment of the invention. Communication network 200 includes a cognitive radio (CR) system 202 operating in accordance with the invention so as not to interfere with incumbent system 204 or other CR systems 206. Communication radio system 202 includes at least one CR unit. For the purposes of this application a CR unit can be either a subscriber CR device 208 or 218 or a CR base station 210. Note that CR device 208 is a geo-location enabled device that uses geo-location database techniques (as illustrated by box 216) to determine transmit power levels, while CR device 218 relies on spectral sensing measurements to determine transmit power levels (as shown in box 236). Geo-location enabled CR devices 208 may also use spectral sensing techniques. The subscriber CR device 208 or 218 is preferably a mobile device, such as a portable two-way radio, vehicle mounted radio, or the like. The CR base station 210 may be either a fixed portable device (as shown) or fixed base site utilizing an antenna tower. In some cases, depending upon the type of communication system, the base station may also be moving.

In operation, CR subscriber devices 208, 218 may communicate directly with each other and/or via the base station 210, depending on the type of network within which they are being used. Examples of wireless communication networks within which the CR units of the present invention are applicable, include but are not limited to, public safety networks, home wireless networks, and wide-area wireless broadband networks. The CR units of the present invention co-exist with incumbent system 204 and other CR system 206 in a manner to be described herein in accordance with various embodiments of the invention. The incumbent system 204 typically includes several incumbent receivers 207 (e.g., TV receivers) which must not be subject to undue interference from the CR system 202.

Each geo-location enabled CR device 208 includes its own transmitter 212 and a controller 214 in conjunction with geo-location database information 216. Each CR device 218 includes transmitter 232 and controller 234 in conjunction with sensing capability 236 which provides the subscriber with sensing-only CR capability. The CR base station includes transmitter 222, controller 224 and at least one of geo-location information 226 and/or sensing capability 228. In general, geo-location enabled base stations are also sensing enabled. The CR units 208 rely in part on geo-location information 216 (either from geo-location algorithms, computations or a pre-computed geo-location database) contained in controller 214 in order to determine key CR system operating parameters (e.g., allowed transmit power, operational bandwidth, transmit time duration, etc.) versus location. CR unit 218, on the other hand, relies on sensing information 236 contained in controller 234 in order to determine its key CR system operating parameters (e.g., allowed transmit power, operational bandwidth, transmit time duration, etc.). CR base unit 210 relies on geo-location information 226 contained in controller 224 and/or sensing information 228. For the purposes of this application, incumbent protection is described in terms of the CR units 208 and 218 with the understanding that these techniques are also applicable to the base station 210.

The CR unit 218 utilizes a power determination technique in accordance with an embodiment of the invention that adjusts transmitter power level (and hence transmitter splatter) in response to a sensed incumbent signal level on channels beyond the adjacent channel. CR transmitter power level may also be adjusted as a function of actual or measured CR transmit splatter levels. The basic steps for sensing-only CR units 218 are as follows:

CR unit 218 scans channels to determine which ones are occupied by incumbent signals. The CR unit 218 then determines the type of licensed incumbent on each occupied channel. Examples of licensed incumbents might be, for example, Advanced Television Systems Committee (ATSC) signals, digital video broadcast (DVB) signals, National Television System Committee (NTSC) signals (regulated under the analog television system in use in the United States, Canada, Japan, Mexico, the Philippines, South Korea, Taiwan, and some other countries); and land mobile radio (LMR) signals, to name a few. In general, each type of licensed incumbent will have its own specific interference protection (D/U) requirements, as illustrated in Table 1 for DTV signals. The specific interference protection requirements are generally determined by typical receiver performance levels for the type of system.

Once the type of incumbent signal is determined, the CR unit 218 looks up required interference protection levels (as in the Table 1) for each type of incumbent receiver. For example co-channel, adjacent channel, alternate channel and channels beyond alternate channel can be looked up (using controller 234) as these typically have interference protection levels specified by their respective standards or regulatory bodies. The CR unit 218 then measures nominal incumbent signal levels (e.g., average received signal strength) on the occupied channels (i.e., on the CR unit's co-channel, adjacent channels, alternate channels and M channels beyond).

CR unit 218 then computes a maximum allowed CR transmit power based on prescribed power level offset values, an assumed path loss to the (nearest) licensed receivers, and the co-channel, adjacent channel, alternate channel and beyond (to N) incumbent signal level measurements. CR interference levels are typically modeled at a nominal interference range (for example, 10 meters as suggested by the FCC). Typically, a regulatory body, such as the FCC, will specify how many channels away from the CR unit's active operating channel (C) must be examined (e.g., C−2, C−1, C, C+1, C+2, or out to the significant alternate channel emissions of the CR unit). Note that any incumbent receivers operating on any of these channels will be affected. For example, according to Table 1 above, a DTV receiver operating on channel C−2 will not experience interference if the on-channel CR transmitter signal (on channel C) is less than 44 dB stronger than the desired TV signal (on channel C−2), and the CR transmitter's OOB splatter level (described below) on channel C−2 is at least 23 dB weaker than the desired TV signal. Note that incumbent receivers on all of the specified channel offsets need to be considered in any transmit power determination analysis.

Specific transmit power level offsets are applied (i.e., added or subtracted) by CR unit 218 from the measured incumbent signal levels for adjacent channels, alternate channels and beyond alternate channels to determine an initial maximum allowable CR transmit power levels due to Type I interference effects. The initial maximum allowable CR transmit power level will be determined by the most stringent (i.e., minimum) allowable CR transmit power level (for the set of adjacent, alternate and beyond alternate channels). The specific transmit power level offset values are typically based in part on the required incumbent receiver interference protection levels (for each channel offset). The power level offsets may also include some additional margin to account for the inherent uncertainty of the CR unit's sensing measurements (i.e., variability/errors in measured incumbent received signal strengths). The offset levels are generally determined by the incumbent receiver specifications and operating regulations (e.g., directly specified by the FCC). For instance, ATSC A/74 provides receiver recommended interference requirements for digital television (DTV) receivers (shown in the Table 1). In order to add additional margin to these interference protection ratios (to help account for uncertainty in sensed incumbent signal levels), they may be increased by a nominal amount (e.g., by adding 5 dB to the listed D/U ratios). For example, a sensing-only CR unit might be prevented from presenting an alternate channel signal (to the affected DTV receiver) that is greater than 39 dB stronger than the desired received DTV signal (instead of the specified 44 dB ratio). Additional corrections may be added or subtracted from the protection ratios to account for other effects (such as differences in TV receiver and CR unit antenna gains, etc.) without any loss in generality in the described power determination algorithms.

In accordance with the present invention, CR unit 218 also applies additional power level reductions in response to CR transmitter splatter (OOBE) levels. These additional power restrictions are based in part on the incumbent receiver's co-channel interference limits (e.g., 23 dB for DTV receivers) and assumed CR signal path losses to the nearest affected incumbent receiver (as described above). Also as described above, additional margin may be added to the protection ratios or power level offset values for sensing-only CR units, to account for uncertainty in measured incumbent signal levels. Continuing the above example, a CR unit may be prevented from presenting a co-channel interference signal (due to CR transmitter splatter) to a DTV receiver that is anything less than 28 dB below than the estimated desired DTV signal strength (assuming a 5 dB protection margin). Note that the actual level of co-channel interference presented to the TV receiver will depend on how far removed (i.e., how many channels away) the CR transmission is occurring (since the relative CR splatter levels typically decline in level the further removed in frequency from the active CR operating channel—see also FIG. 5, fully described below). Also note that the incumbent co-channel interference protection ratios could actually be relaxed (i.e., reduced) as the incumbent signal gets stronger (e.g., closer to the transmitter), since the CR unit's interfering signal would become the dominant form of interference (over thermal noise).

The CR unit's 218 splatter levels may be estimated (from a nominal transmitter spectral mask to be described herein) or actual CR TX splatter levels may be measured (e.g., on clear channels, or directly measured at the transmitter output). Importantly, note that splatter levels may also be estimated (predicted or measured) given actual transmitter power output level (such that CR transmit splatter levels may improve non-linearly at lower CR transmitter output power levels). In this manner, for example, a 3 dB reduction in CR transmitter output power level may result in a 9 dB improvement in CR adjacent channel splatter levels (if caused by $3^{rd}$ order distortion effects). This effect can be very important in determining allowable CR unit transmit power levels. The reduction in CR transmitter splatter levels vs. output power level may be determined ahead of time (e.g., in the factory) and stored, or determined in the field through measurements of actual splatter levels. Note that most CR devices typically have spectrum sensing capability which includes power measurement capability within a specified bandwidth. Thus, the described CR splatter level estimation techniques apply to both sensing-only CR devices and geo-location enabled CR devices.

Table II provides an example of adjacent and alternate channel splatter levels for a noise-like modulation and hyperbolic tangent nonlinearity vs. input power. Note the $3^{rd}$ order distortion effects in the alternate channel emissions.

TABLE II

| Input Power | Adjacent (N +/− 1) channel relative level (dBr) | Alternate (N +/− 2) channel relative level (dBr) | 2nd alternate (N +/− 3) channel relative level (dBr) |
| --- | --- | --- | --- |
| −30 | −64.98 | −127.56 | −131.45 |
| −25 | −55.12 | −110.17 | −131.45 |
| −20 | −45.41 | −90.83 | −130.86 |
| −15 | −36.22 | −72.53 | −112.09 |
| −10 | −28.21 | −56.54 | −87.81 |

Geo-location enabled CR units (such as 208) do not have to sense or measure incumbent signal levels on adjacent, alternate (and beyond) channels, since they can directly compute expected incumbent signal levels at the nearest affected incumbent receiver based on its location. Typically, such computations are based on incumbent transmitter parameters (e.g., transmitter location, power, antenna height, etc.) and well accepted propagation models (e.g., FCC F(50,90) or F(90,90) curves for DTV signals). Alternatively, the computation results may be looked up in a pre-computed or stored database (e.g., 216) based on CR unit location. Typically, geo-location based estimated incumbent signal levels are conservative and subject to fewer variations (e.g., shadowing, fading, etc.) and are thus more reliable, resulting in the need for less margin in interference protection ratios. The remainder of the above described interference protection algorithms remain essentially the same for geo-location units.

As an example utilizing Table 1 in conjunction with FIG. 2, for a CR unit 208 operating on TV channel N=28 with a DTV signal 207 on channel 26 (N+2 alternate channel receiver specification), the CR unit 208 adjusts its EIRP based on the DTV's (channel 26) signal strength along with assumed path loss to the victim DTV receiver 207 to satisfy the adjacent channel interference protection ratio (−44 dB D/U) at the TV receiver. To present this large of an off-channel interferer to the TV set 207, the CR transmitter adjacent channel emissions need to satisfy column 3 of Table 1 (or better) to meet the co-channel interference specification into the affected TV channel. Note that many CR transmitters will not be able to meet this level of performance due to technology limitations and cost constraints.

CR transmitters that do not fully satisfy the relative off-channel emission levels indicated in Table 1 do not have to be precluded from operating on the channel. Rather, the CR emissions can be adjusted such that the limiting interference mechanism in the DTV receiver 207 is satisfied. Continuing with the example, a CR transmitter 208 operating on channel 28 that only has a splatter level of −57 dBr/6 MHz rather than the recommended −67 dBr/6 MHz would not be able to present a −44 dB adjacent channel D/U ratio at the DTV set 207 without violating the specific co-channel interference emissions in the TV receiver (44 dB larger −57 dBr (N+2) emissions=−13 dB interference, which violates the required on-channel C/I value). To maintain the +23 dB D/U ratio recommended for the desired (channel 26) DTV receiver co-channel interference protection, the CR should be limited to presenting −34 dB D/U ratio in upper alternate channel 28 (meaning that the CR signal can only be 34 dB stronger than the received incumbent alternate channel TV signal, rather than 44 dB stronger).

Figure 4:
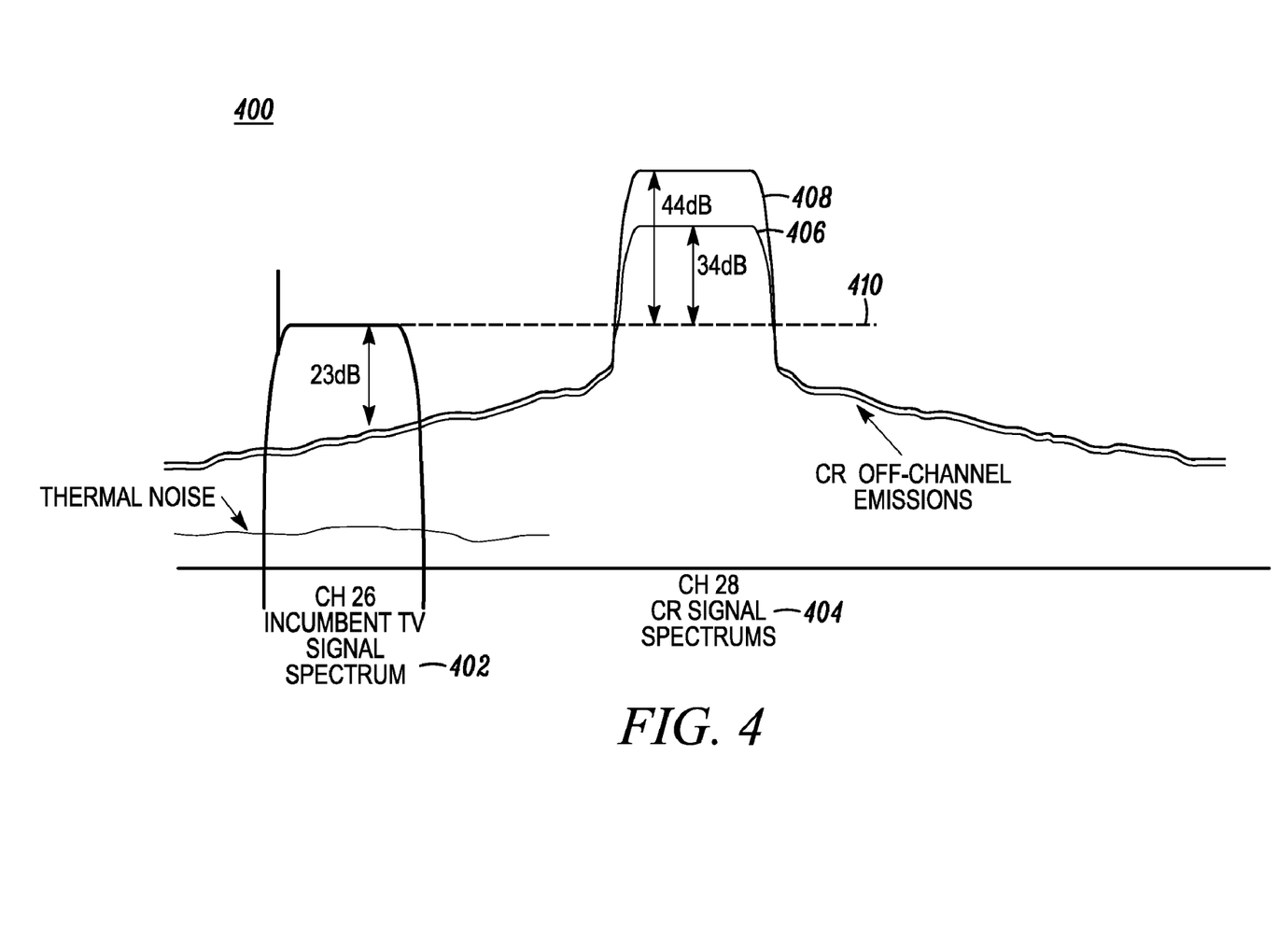
FIG. 4 illustrates an example of off-channel emission of a CR signal as viewed at an incumbent receiver in accordance with an embodiment of the invention.

FIG. 4 visually depicts the example of both on-channel and off-channel emissions of two CR units 208 (operating on channel 28 (404), which is an alternate channel to the incumbent signal spectrum on channel 26 (402), such as a DTV signal. Note that the CR unit 208s' transmitter splatter on its alternate channel falls co-channel with channel 26 incumbent signal (402), as viewed at the TV receiver 207). Both Type I (alternate channel 404) and Type II (co-channel 402) interference effects are exhibited in FIG. 4, and both types of interference protection ratios must be satisfied, as described above. The CR device with poorer emission ratios, 406, would be allowed (e.g., 10 dB) less EIRP than the CR unit with better emission ratios, 408, up to a limit defined by the predetermined recommended TV selectivity (line 410 signifies the average received incumbent signal level, from which the interference protection ratios are based). Note that the incumbent signal level may be predicted based on location (as in geo-location enabled CR units), or it may be measured (as in sensing-only CR units).

Geo-location based CR transmit power computations are able to readily and accurately take the effects of FIG. 4 into account. The 10 dB difference in EIRP for this example puts the poorer emissions CR unit at a disadvantage (either reduced range or reduced throughput) compared to the better emissions ratios CR unit, but the advantage can be that of a lower priced product (due to relaxed transmitter implementation requirements in the poorer emissions unit). For a wide variety of short range applications, reduced transmit power levels with reduced relative transmit spectral masks may be adequate. In both cases however, utilizing the above described mechanisms adequately protects incumbents from harmful interference.

The sensing-only CR unit 218 has no direct way to compute required protection ratios and TV signal power levels, and thus has to make conservative assumptions (with margin) based on sensed adjacent, alternate channel and/or beyond alternate channel incumbent signal strengths.

In general, CR transmitters with greater spectral purity will, as indicated previously, enjoy higher EIRP levels, and hence have higher performance levels for a given local environment, such as local TV signal strength. The ideal transmit mask example shown in Table 1 is, as already indicated, adequate to allow the highest EIRP levels at the CR transmitter given that Type I interference protection requirements are met, but relaxed off-channel ratios may still prove useful in practice (especially for higher power or variable frequency transmitters). As long as sufficient transmit power level corrections are applied (whether in geo-location CR devices directly, or in sensing-only CR units with appropriate margins) incumbent receiver protection can be assured.

Figure 5:
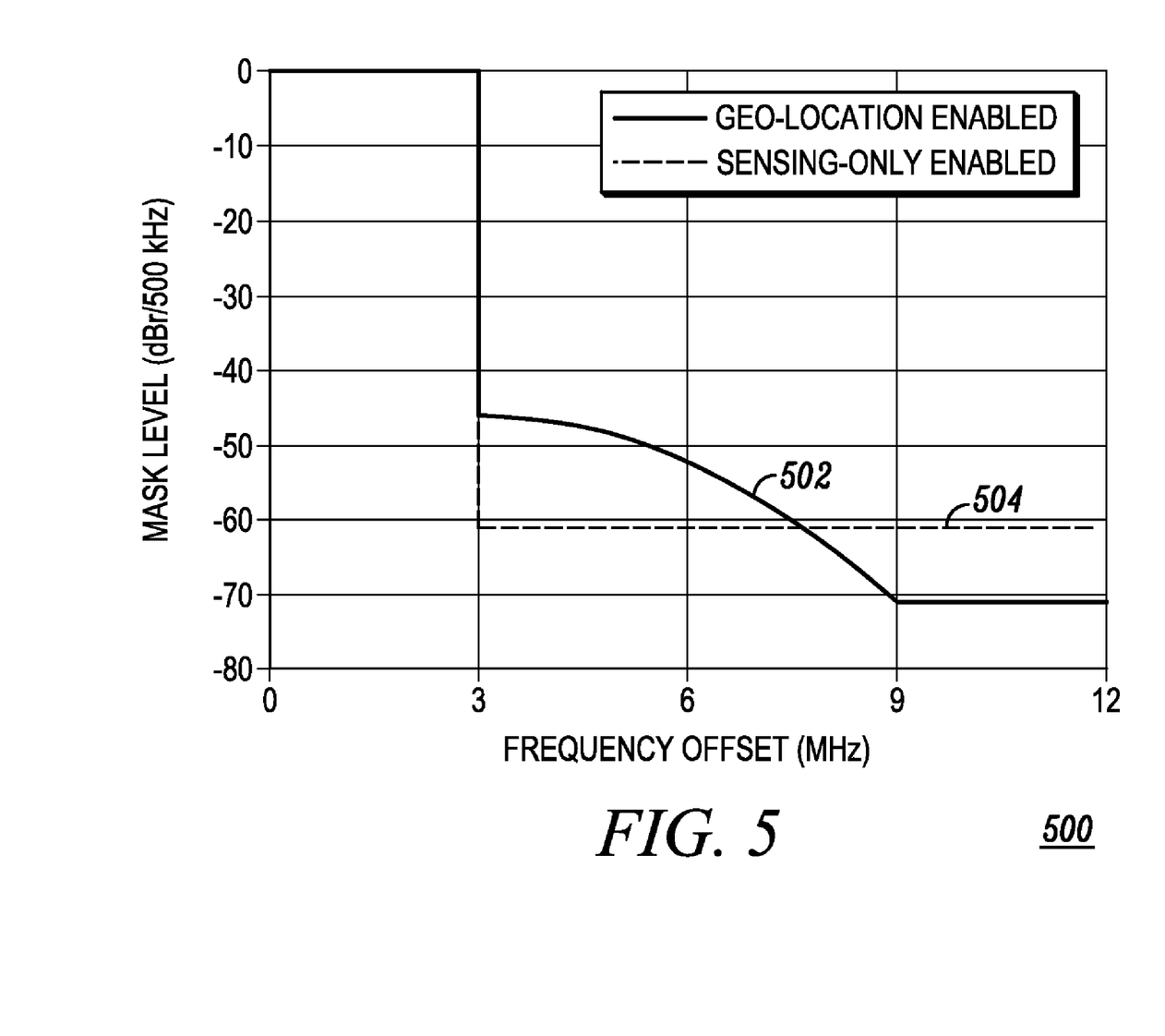
FIG. 5 shows examples of two different transmit spectral masks (e.g., one applicable to geo-location enabled CR devices, and one applicable to sensing-only CR devices) in accordance with an embodiment of the invention.

Nominal CR transmitter spectral masks are typically specified by regulatory bodies. For example, the original proposal for the use of TV whitespace recommended FCC Part 15.209 (a) emissions outside of the actively utilized channel, which provides a spectral mask specification 504 is shown in FIG. 5. Note that while the mask of FIG. 5 is very strict, it is not tight enough to prevent interference issues in the field without taking into account at least adjacent and alternate channel signal levels. In other words, the mask restrictions are not sufficient to be used alone in the protection of incumbent receivers from CR devices wishing to share spectrum. Transmitter splatter can also be modeled based on knowledge of the nonlinear performance of the transmitter and the transmit power level setting, as mentioned above. Actual transmitter splatter can also be measured based on transmit power level, which advantageously takes into account CR OOBE that are better than the specified (worst case) transmit spectral mask.

In general, sensing only CR units 218 must estimate incumbent signal strength levels through local over-the-air measurements (which are subject to numerous variations, including sensing antenna gain, height, polarization, building penetration losses, and local fading/shadowing effects). As such, these estimates will generally be less reliable than computed incumbent signal strength levels based on geo-location database techniques. Therefore, the receive protection ratios or power level offsets may be made more conservative to account for these measurement variations in sensing-only CR devices as described above.

Figure 3:
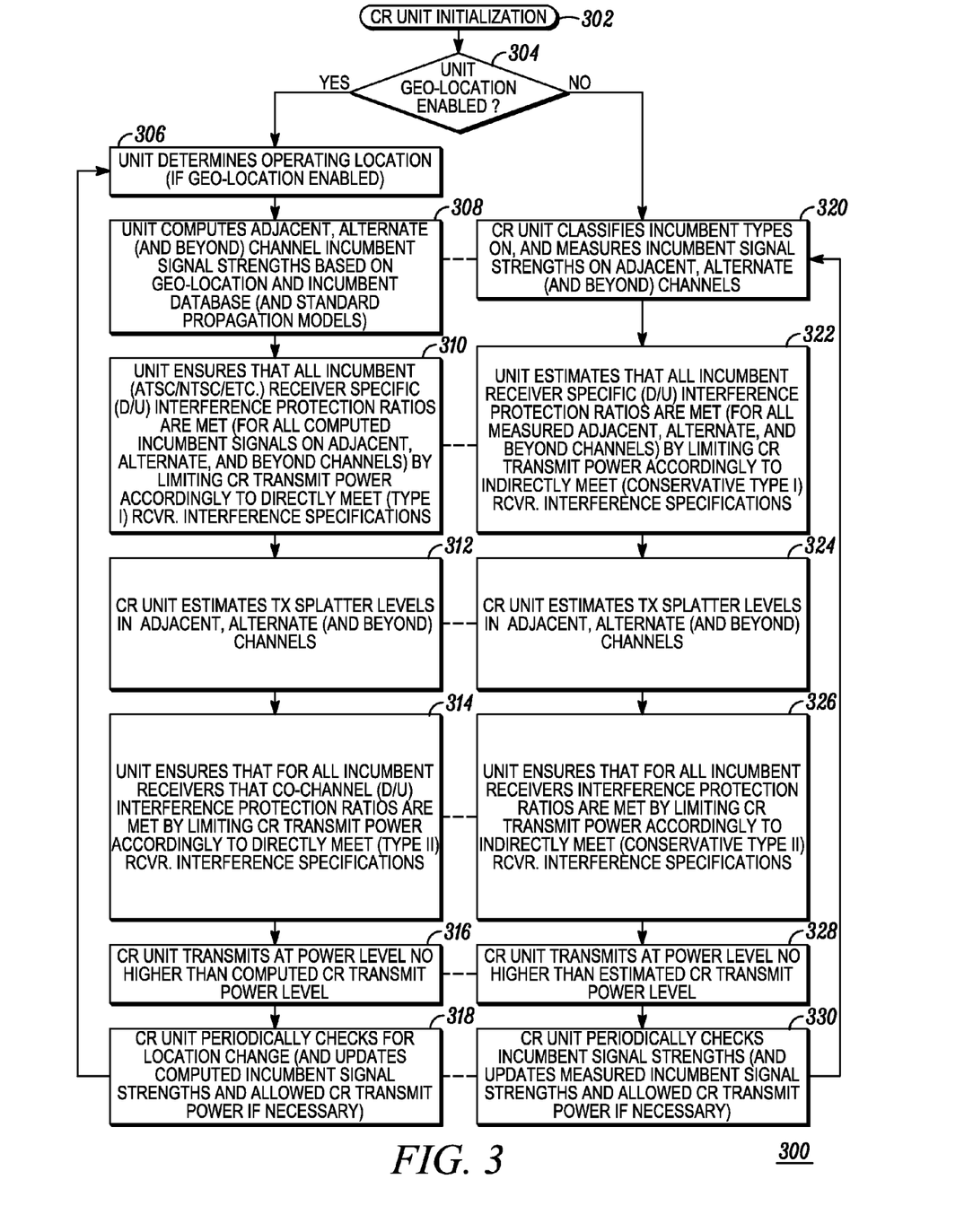
FIG. 3 illustrates a method of controlling CR transmit power and splatter levels in accordance with an embodiment of the invention.

FIG. 3 summarizes a technique 300 used by both geo-location enabled and sensing-only CR devices to determine transmit maximum power levels and transmit splatter levels that will not interfere with incumbent receivers in accordance with an embodiment of the invention. Beginning with CR initialization at 302, the CR unit determines whether geo-location capability is enabled at 304. If geo-location based capability is enabled, then the technique moves to step 306 where the geo-location CR device determines its operating location. The geo-location unit then computes at 308 incumbent signal strengths on its adjacent channels, alternate channels and beyond (according to regulations). This computation is based on the unit's operating location, the incumbent transmitter database, and standard propagation models, as described above. Note that if any incumbent signals are present on the CR unit's co-channel, all of the interference protection ratios will need to be met for that incumbent too. In many cases, CR unit operation will only be allowed when located outside of an incumbent's service area (outlined by its protected service contour), and CR unit interference effects will be computed at the nearest point on the incumbents protected service contour.

The geo-location CR unit then ensures at 310 that all incumbent receiver specific interference protection ratios are met for all computed incumbent signals (on each affected incumbent receiver's adjacent channel, alternate channel and beyond) by limiting CR transmit power to directly meet Type 1 receiver interference specifications, as described above.

Moving to 312, the geo-location CR unit estimates its transmit splatter levels in adjacent, alternate and beyond alternate channels. The estimation can be achieved by implied transmit power level and a specified transmitter spectral mask or the estimate can be measured on a clear channel for a given transmit power level. As described above, any type of CR unit (geo-location enabled or sensing-only enabled) could be pre-characterized for splatter vs. transmit power level (e.g., in the factory, or by design), or the CR unit can measure its splatter dynamically in the field by setting a particular transmit power level and using the CR unit's sensing apparatus to measure power in adjacent, alternate (and beyond) channels. This measurement could be performed directly by bypassing the unit's antenna (directly connecting the transmitter to the receiver through known attenuation), or by transmitting and receiving over the air on a clear frequency. The above approaches will give a direct measure of actual CR transmitter splatter levels for a given transmitter power output level. Reduced splatter levels at lower output power levels will likely result in increased overall maximum allowable transmit power levels for many CR devices.

The geo-location unit then ensures at 314 that, for all incumbent receivers, their co-channel interference protection ratios are satisfied by limiting CR transmit power (and hence transmitter splatter) to directly meet Type 2 receiver interference specifications. The incumbent receivers may be, for example, ATSC, NTSC, or DVB-T receivers to name a few. Note again that if the particular transmitter splatter level (for a given power output level) is less than the required ideal mask level (e.g., given in Table 1 for DTV), then no further CR transmitter power level reduction is needed. The channel interference protection ratios are determined based on the estimated CR unit transmit splatter levels and computed incumbent signal strengths.

For example, assume that a CR unit is operating on an incumbent DTV receiver's alternate channel. The incumbent signal is estimated to be at −80 dBm signal strength at the nearest affected receiver's location (e.g., at the TV receiver antenna, 10 m away from the CR unit). Assume that for Type I interference constraints (described above) to be met, the CR unit can transmit with no more than +12 dBm EIRP (equal to the −80 dBm incumbent signal level—(−44) dB alt. channel interference protection ratio +48 dB 10 m square law path loss). Although the CR unit's alternate channel transmitter splatter level may be only −40 dBr/6 MHz at it's full rated output power of say, +30 dBm (1 W), it's alternate channel transmitter splatter can be measured or characterized to be only −68 dBr/6 MHz (for example) at the actual +12 dBm operating output power level. This level of transmitter splatter is better than the level in Table I, requiring no further transmit power level reduction. If the alternate channel transmitter splatter had not improved at lower power levels (and remained at −40 dBr/6 MHz at the +12 dBm power output level), then the CR transmitter would have to further reduce its output power level to −15 dBm (equal to the −80 dBm incumbent signal level −23 dB co-channel interference protection ratio—(−40 dBr/6 MHz) CR TX alt. channel splatter level +48 dB 10 m square law path loss). Note that the difference in the two transmit power levels (determined between the Type I and Type II interference effects) corresponds to how far short of the ideal mask (in Table I) that the CR unit's transmitter splatter falls in the alternate channel (e.g., −67 dBr/6 MHz ideal—(−40 dBr/6 MHz actual)=27 dB power reduction due to Type II splatter effects). Also note that sensing-only CR units would perform similar calculations (with measured incumbent signal levels instead of location predicted signal levels), though sensing-only units may employ additional safety margin in the required protection ratios (as described above).

The geo-location CR unit then transmits at 316 at power levels no higher than the computed CR transmit power level (limited by either Type I or Type II interference effects for each of the adjacent and alternate channels). The geo-location CR unit periodically checks at 318 for location change and updates computed incumbent signal strengths and allowed CR transmit power if necessary (repeating the entire process).

If step 304 determines the CR device is not geo-location enabled, the technique switches over to the sensing-only path where the sensing-only CR unit at 320 classifies incumbent types (e.g., ATSC, NTSC, etc.) on adjacent, alternate and beyond alternate channels. The CR unit also measures the incumbent received signal strengths on the adjacent, alternate and beyond alternate channels. If the CR unit cannot accurately characterize the type of incumbent present on those channels, it should default to utilizing global worst-case interference protection ratios (from the most interference susceptible type of system that could be present).

At 322, the sensing-only CR unit estimates whether all incumbent receiver interference protection ratios are met (for all measured adjacent channel, alternate channel and beyond alternate channel signal levels) by limiting CR transmit power to indirectly meet Type 1 receiver interference specifications (as described above). The incumbent systems may be for example ATSC or NTSC to name a few, and each incumbent system has its own specific protection ratio for adjacent, alternate and beyond alternate channels.

The sensing-only CR unit then estimates at 324 its transmit splatter levels in adjacent, alternate and beyond alternate channels, as described above. The transmit splatter estimate can be either implied by CR transmit power level and/or specified transmitter spectral mask or the transmit splatter can be estimated by measuring it directly for a given transmit power level, either on a clear channel or by bypassing the antenna.

The sensing-only CR unit then ensures at 326 that for all incumbent receivers (ATSC, NTSC, etc.) on its adjacent channel, alternate channel, and beyond alternate channel that incumbent co-channel interference protection ratios are met. This is determined based on estimating CR unit transmit splatter levels and measured incumbent signal strengths, and by limiting transmit power to indirectly meet Type 2 (conservative) receiver interference specifications, as described above.

At 328 the sensing-only CR unit transmits at a power level no higher than the estimated transmit power level from 326. The sensing-only CR unit periodically checks at 330 incumbent signal strengths and updates measured incumbent signal strengths and the computed allowed CR transmit power as needed.

Accordingly, there has been provided a means for having a CR unit operate within the spectrum of an incumbent receiver by taking measurements of or making calculations of incumbent signals for alternate channels and beyond in conjunction with setting power levels based on CR transmitter splatter into the incumbent receivers' co-channel as a function of transmit power level. The CR splatter levels may be estimated, measured or pre-computed. In the simplest, worst case form, splatter levels can be estimated based on a predetermined transmit spectral mask. Splatter levels can also be measured dynamically to determine out-of-band emission levels. Splatter can be calculated based on prior knowledge of the transmitter lineup and power amplifier characteristics of the CR unit. Splatter levels may also be characterized in the factory, and stored in the unit for future use.

The combined method provided by the technique of the present invention takes into account alternate channel (and beyond) interference protection ratios as well as CR transmitter splatter levels. Careful consideration of the alternate channel and beyond alternate channel effects ensure interference-free operation of licensed incumbents, thus allowing CR units to operate within the incumbent's spectrum and geography.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operating a cognitive radio (CR) device to avoid interference with an incumbent receiver, comprising:
    determining maximum allowed transmit power level of the CR device based on at least one estimated incumbent signal level in a local environment, at least one corresponding estimated transmitter splatter level of the CR device, and at least one co-channel incumbent receiver protection requirement;
    wherein the step of determining further comprises:
        applying an offset from the at least one estimated incumbent signal level, said offset determined by the at least one co-channel incumbent receiver interference protection requirement; and
        selecting a transmit power level that is a minimum of the at least one estimated incumbent signal level; and
    wherein the step of determining further comprises:
        applying an offset from the at least one estimated incumbent signal level based on the least one corresponding estimated transmitter splatter level and the at least one incumbent receiver co-channel interference protection requirement; and
        selecting a transmit power level that is a minimum as determined by the at least one transmitter splatter level; and
    transmitting with the maximum allowed transmit power level thereby avoiding interference with the incumbent receiver while maximizing transmit power level of the CR device.

2. A method of operating a cognitive radio (CR) device to avoid interference with an incumbent receiver, comprising:
    estimating an incumbent signal level at the incumbent receiver;
    determining interference protection ratios for the incumbent device, including a co-channel interference protection ratio for the incumbent;
    applying a transmit power level reduction to the CR device based on the interference protection ratios and the estimated incumbent signal level;
    estimating at least one CR transmitter out-of-band splatter level into a co-channel of the incumbent receiver; and
    applying a further CR transmit power level reduction based on the estimated CR transmitter splatter level, estimated incumbent signal level, and the incumbent receiver co-channel interference protection ratio thereby avoiding interference with the incumbent receiver.

3. The method of claim 2, wherein the steps are repeated for a plurality of incumbent signals received at the incumbent receiver.

4. The method of claim 2, wherein the step of estimating an incumbent signal level comprises computing the incumbent signal level for a channel based on geo-location of the incumbent receiver.

5. The method of claim 2, wherein the step of estimating an incumbent signal level comprises taking spectral sensing measurements of the incumbent signal.

6. The method of claim 2, wherein the CR device comprises a mobile CR radio operating within a public safety network and the CR device includes at least one of sensing capability and geo-location capability.

7. The CR device of claim 2, wherein the CR device comprises a mobile CR radio operating within a public safety network.

8. The CR device of claim 2, wherein the CR device periodically checks for location changes or sensed signal level changes and updates incumbent signal strength and CR transmit power level.

9. A method of operating a cognitive radio (CR) device to avoid interference with an incumbent receiver, comprising:
    estimating an incumbent signal level at the incumbent receiver;

determining interference protection ratios for the incumbent device, including a co-channel interference protection ratio for the incumbent;

applying a transmit power level reduction to the CR device based on the interference protection ratios and the estimated incumbent signal level;

estimating at least one CR transmitter out-of-band splatter level, wherein the step of estimating the at least one CR transmitter out-of-band splatter level is predicted based on a predetermined mask level; and applying a further CR transmit power level reduction based on the estimated CR transmitter splatter level, estimated incumbent signal level, and the incumbent receiver co-channel interference protection ratio.

10. A method of operating a cognitive radio (CR) device to avoid interference with an incumbent receiver, comprising:

estimating an incumbent signal level at the incumbent receiver;

determining interference protection ratios for the incumbent device, including a co-channel interference protection ratio for the incumbent;

applying a transmit power level reduction to the CR device based on the interference protection ratios and the estimated incumbent signal level;

estimating at least one CR transmitter out-of-band splatter level, wherein the step of estimating the at least one CR transmitter out-of-band splatter level is based on a combination of predetermined CR transmitter characteristics and knowledge of CR transmitter power level; and applying a further CR transmit power level reduction based on the estimated CR transmitter splatter level, estimated incumbent signal level, and the incumbent receiver co-channel interference protection ratio.

11. A method of operating a cognitive radio (CR) device to avoid interference with an incumbent receiver, comprising:

estimating an incumbent signal level at the incumbent receiver;

determining interference protection ratios for the incumbent device, including a co-channel interference protection ratio for the incumbent;

applying a transmit power level reduction to the CR device based on the interference protection ratios and the estimated incumbent signal level;

estimating at least one CR transmitter out-of-band splatter level, wherein the step of estimating the at least one CR transmitter out-of-band splatter level is based on:

measuring the at least one CR transmitter out-of-band emission at a least one power output level; and utilizing the measured at least one CR transmitter out-of-band splatter level during the step of applying a further transmit power level reduction; and applying a further CR transmit power level reduction based on the estimated CR transmitter splatter level, estimated incumbent signal level, and the incumbent receiver co-channel interference protection ratio.

12. A method of operating a cognitive radio (CR) device to avoid interference with an incumbent receiver, comprising:

estimating an incumbent signal level at the incumbent receiver;

determining interference protection ratios for the incumbent device, including a co-channel interference protection ratio for the incumbent;

applying a transmit power level reduction to the CR device based on the interference protection ratios and the estimated incumbent signal level;

estimating at least one CR transmitter out-of-band splatter level, wherein the at least one CR transmitter out-of-band splatter level is modeled based on knowledge of nonlinear performance of the transmitter and the transmit power level setting; and applying a further CR transmit power level reduction based on the estimated CR transmitter splatter level, estimated incumbent signal level, and the incumbent receiver co-channel interference protection ratio.

13. A cognitive radio (CR) device operating within an incumbent receiver's spectrum, the CR device comprising:

a transmitter;

a controller coupled to the transmitter and having at least one of a geo-location database or sensing capability, the CR device estimating incumbent signal levels and estimating CR transmitter out-of-band splatter levels into a co-channel of the incumbent receiver's spectrum; and the CR device adjusting transmit power level in response to the estimated incumbent signal levels and the estimated CR transmitter out-of-band splatter levels thereby avoiding interference with the incumbent receiver.

14. The CR device of claim 13, wherein the CR device comprises a mobile CR radio operating within a public safety network and the mobile CR radio includes at least one of sensing capability and geo-location capability.

* * * * *